(12) United States Patent
Goetzke et al.

(10) Patent No.: US 9,273,604 B2
(45) Date of Patent: Mar. 1, 2016

(54) CRANKSHAFT

(71) Applicant: Electro-Motive Diesel, Inc., LaGrange, IL (US)

(72) Inventors: Michael B. Goetzke, Orland Park, IL (US); Vijaya Kumar, Darien, IL (US); Jin Yu, Westmont, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 462 days.

(21) Appl. No.: 13/763,387

(22) Filed: Feb. 8, 2013

(65) Prior Publication Data

US 2014/0224196 A1  Aug. 14, 2014

(51) Int. Cl.
*F02B 75/06* (2006.01)
*F02B 75/00* (2006.01)
*F16F 15/28* (2006.01)
*F16C 3/20* (2006.01)
*F16C 3/12* (2006.01)

(52) U.S. Cl.
CPC . *F02B 75/00* (2013.01); *F16C 3/20* (2013.01); *F16F 15/283* (2013.01); *F16C 3/12* (2013.01); *F16C 2360/22* (2013.01); *Y10T 74/2183* (2015.01)

(58) Field of Classification Search
CPC ............ Y10T 74/2183; Y10T 74/2173; Y10T 74/2177; Y10T 464/50; F16C 3/20; F16F 15/28; F16F 15/283; F16F 15/286; F16F 15/26; F01B 9/02
USPC ........... 123/192.2; 464/180; 74/603, 595–598
See application file for complete search history.

(56) References Cited

U.S. PATENT DOCUMENTS

| | | | | |
|---|---|---|---|---|
| 14,292 A * | 2/1856 | Fekete | ........................... | 139/293 |
| 1,315,059 A * | 9/1919 | Vincent | ........................... | 74/603 |
| 1,661,341 A * | 3/1928 | Oldson | ........................... | 74/603 |
| 2,419,274 A * | 4/1947 | McDowall et al. | ............. | 74/603 |
| 2,426,874 A | 9/1947 | Hasbrouck et al. | | |
| 4,730,512 A | 3/1988 | Ito et al. | | |
| 4,833,940 A | 5/1989 | Ito | | |
| 5,195,398 A * | 3/1993 | Murrish et al. | ................. | 74/603 |
| 5,481,942 A | 1/1996 | Baek | | |
| 5,758,551 A | 6/1998 | Ozeki | | |
| 7,234,432 B2 | 6/2007 | Nagira | | |
| 2007/0034044 A1 | 2/2007 | Nagira | | |
| 2012/0048226 A1 | 3/2012 | Williams | | |

FOREIGN PATENT DOCUMENTS

| | | |
|---|---|---|
| DE | 102005009305 | 9/2006 |
| EP | 402607 | 12/1990 |
| GB | 398416 | 9/1933 |

(Continued)

*Primary Examiner* — Hung Q Nguyen
(74) *Attorney, Agent, or Firm* — Miller, Matthias & Hull LLP

(57) ABSTRACT

A crankshaft having a front end, a rear end, and a central axis extending from the front end to the rear end is provided. The crankshaft includes a front crankpin, a rear crankpin, and one or more central crankpins. The front crankpin is located in proximity to the front end and the rear crankpin is located in proximity to the rear end. Further, the one or more central crankpins are located substantially equidistant from the front crank pin and the rear crankpin. The crankshaft further includes pairs of counterweights disposed on each side of the front crankpin, the rear crankpin and the one or more central crankpin. The counterweights are disposed such that counterweights in each pair of counterweights are angularly offset with respect to each other.

18 Claims, 3 Drawing Sheets

(56) References Cited

FOREIGN PATENT DOCUMENTS

| | | |
|---|---|---|
| GB | 790749 | 2/1958 |
| GB | 925478 | 5/1963 |
| GB | 1414055 | 11/1975 |
| GB | 2092235 | 8/1982 |
| JP | 2006242201 | 9/2006 |

* cited by examiner

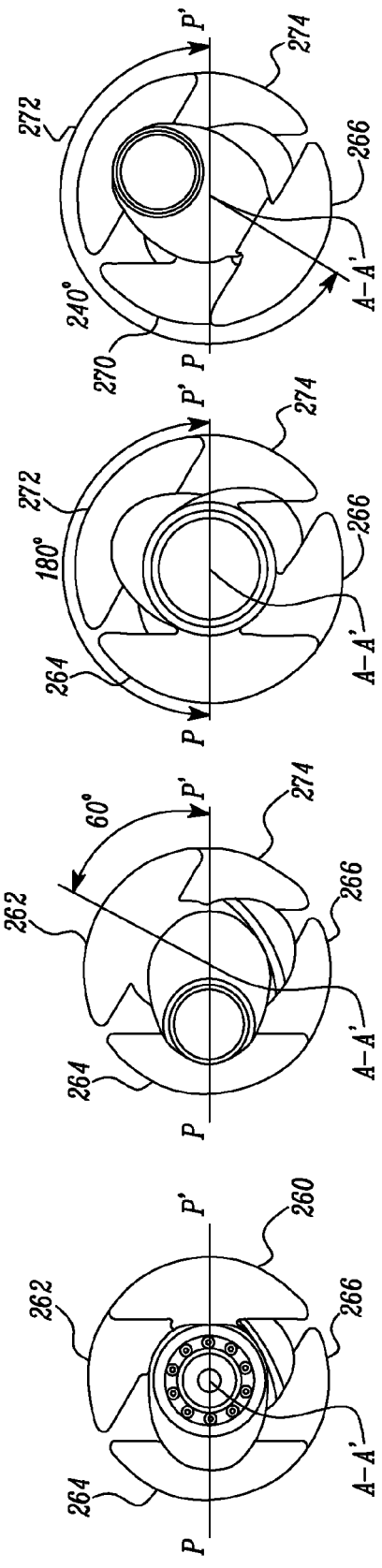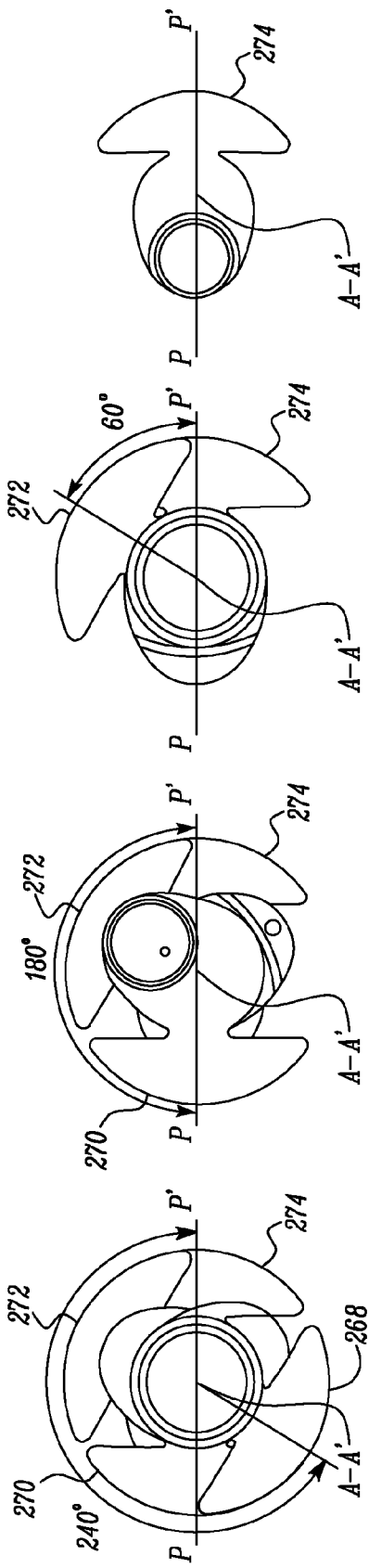

CRANKSHAFT

TECHNICAL FIELD

The present disclosure relates to a crankshaft for an internal combustion engine, and more particularly to a counterweights arrangement for the crankshaft.

BACKGROUND

Typically, in an engine, a crankshaft includes counterweights, where each counterweight is attached to each of the crankshaft's cheeks, in order to balance the engine. However, this kind of counterweight arrangement is difficult to manufacture and expensive too.

U.S. Patent Publication 2012/0048226 relates to a crankshaft for an engine having an odd number of cylinders. The crankshaft includes a central pin coupling a first and a second asymmetric counterweight and a pair of pins coupling cheeks absent counterweights.

SUMMARY

In one aspect, the present disclosure provides a crankshaft having a front end, a rear end, and a central axis extending from the front end to the rear end. The crankshaft includes a front crankpin, a rear crankpin, and one or more central crankpins. The front crankpin is located in proximity to the front end and the rear crankpin is located in proximity to the rear end. Further, the one or more central crankpins are located substantially equidistant from the front crankpin and the rear crankpin. The crankshaft further includes pairs of counterweights disposed on each side of the front crankpin, the rear crankpin and the one or more central crankpins. The counterweights are disposed such that counterweights in each pair of counterweights are angularly offset with respect to each other.

In another aspect, a multiple cylinders internal combustion engine is provided. The multiple cylinders internal combustion engine includes a cylinder block having two banks of cylinders disposed at a predetermined angle with respect to each other. The multiple cylinders internal combustion engine further includes a crankshaft having a front end, a rear end, and a central axis extending from the front end to the rear end. The crankshaft includes a front crankpin, a rear crankpin, and one or more central crankpins. The front crankpin is located in proximity to the front end and the rear crankpin is located in proximity to the rear end. Further, the one or more central crankpins are located substantially equidistant from the front crank pin and the rear crankpin. The crankshaft further includes pairs of counterweights disposed on each side of the front crankpin, the rear crankpin and the one or more central crankpins. The counterweights are disposed such that counterweights in each pair of counterweights are angularly offset with respect to each other In yet another aspect, the present disclosure provides a crankshaft having a front end, a rear end, and a central axis extending from the front end to the rear end. The crankshaft includes a pair of outer crankpins, a pair of inner crankpins, and a pair of central crank pins. The pair of outer crankpins is defined by a first crankpin and a sixth crankpin. The pair of inner crankpins is defined by a second crankpin and a fifth crankpin. The pair of central crankpins is defined by a third crankpin and a fourth crankpin. The crankshaft further includes a first pair of counterweights, a second pair of counterweights, a third pair of counterweights and a fourth pair of counterweights. The first pair of counterweights is disposed on each side of the first crankpin. The first pair of counterweights is arranged such that a first counterweight of the first pair of counterweights is substantially aligned with a horizontal plane perpendicular to the central axis and a second counterweight of the first pair of counterweights is arranged at an angle of 60 degrees from the first counterweight of the first pair of counterweight. The second pair of counterweights is disposed on each side of the third crankpin. The second pair of counterweights is arranged such that a first counterweight of the second pair of counterweights is arranged at an angle of 180 degrees and the second counterweight of the second pair of counterweights is arranged at an angle of 240 degrees from the first counterweight of the first pair of counterweights respectively. The third pair of counterweights is disposed on each side of the fourth crankpin. The third pair of counterweights is arranged such that a first counterweight of the third pair of counterweights is arranged at an angle of 240 degrees and the second counterweight of the third pair of counterweights is arranged at an angle of 180 degrees from the first counterweight of the first pair of counterweights respectively. The fourth pair of counterweights is disposed on each side of the sixth crankpin. The fourth pair of counterweights is arranged such that a first counterweight of the fourth pair of counterweights is arranged at an angle of 60 degrees from the first counterweight of the first pair of counterweights and the second counterweight of the fourth pair of counterweights is substantially aligned with the horizontal plane and the first counterweight of the first pair of counterweights.

Other features and aspects of this disclosure will be apparent from the following description and the accompanying drawings.

BRIEF DESCRIPTION OF THE DRAWINGS

FIGS. 3-10 are sectional views of the crankshaft taken in the direction of arrows in FIG. 2.

DETAILED DESCRIPTION

Figure 1:
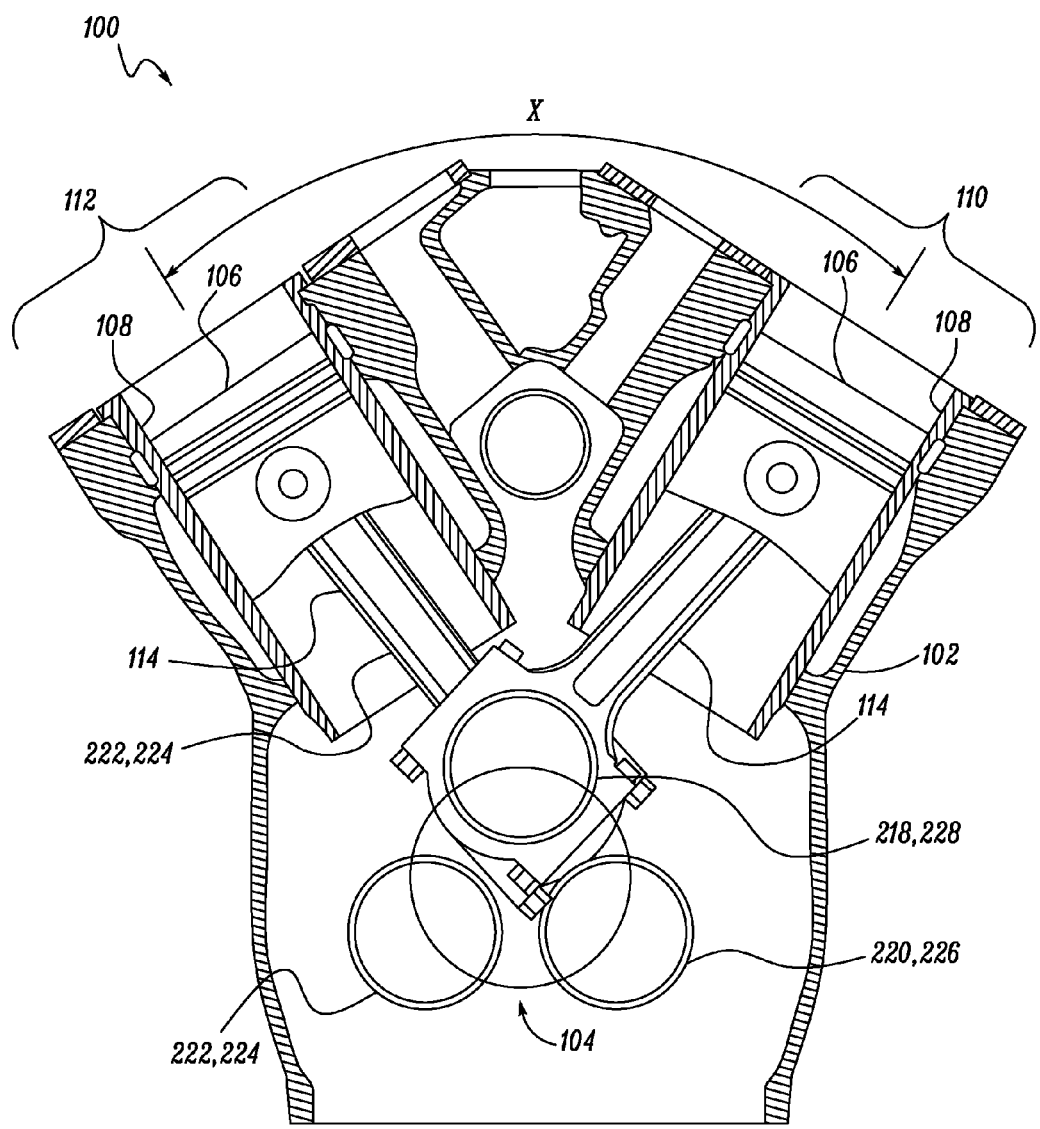
FIG. 1 is a transverse sectional view of an internal combustion engine.

FIG. 1 illustrates a transverse sectional view of a multicylinder internal combustion engine 100, hereinafter referred to as the engine 100. The engine 100 includes a cylinder block 102 enclosing a crankshaft 104. The engine 100 further includes pistons 106 reciprocally mounted on corresponding cylinders 108 on each bank 110 and 112, with the two banks 110 and 112 disposed at a pre-defined angle X relative to each other. In an exemplary embodiment, the pre-defined angle X may be substantially equal to 45 degrees.

Figure 2:
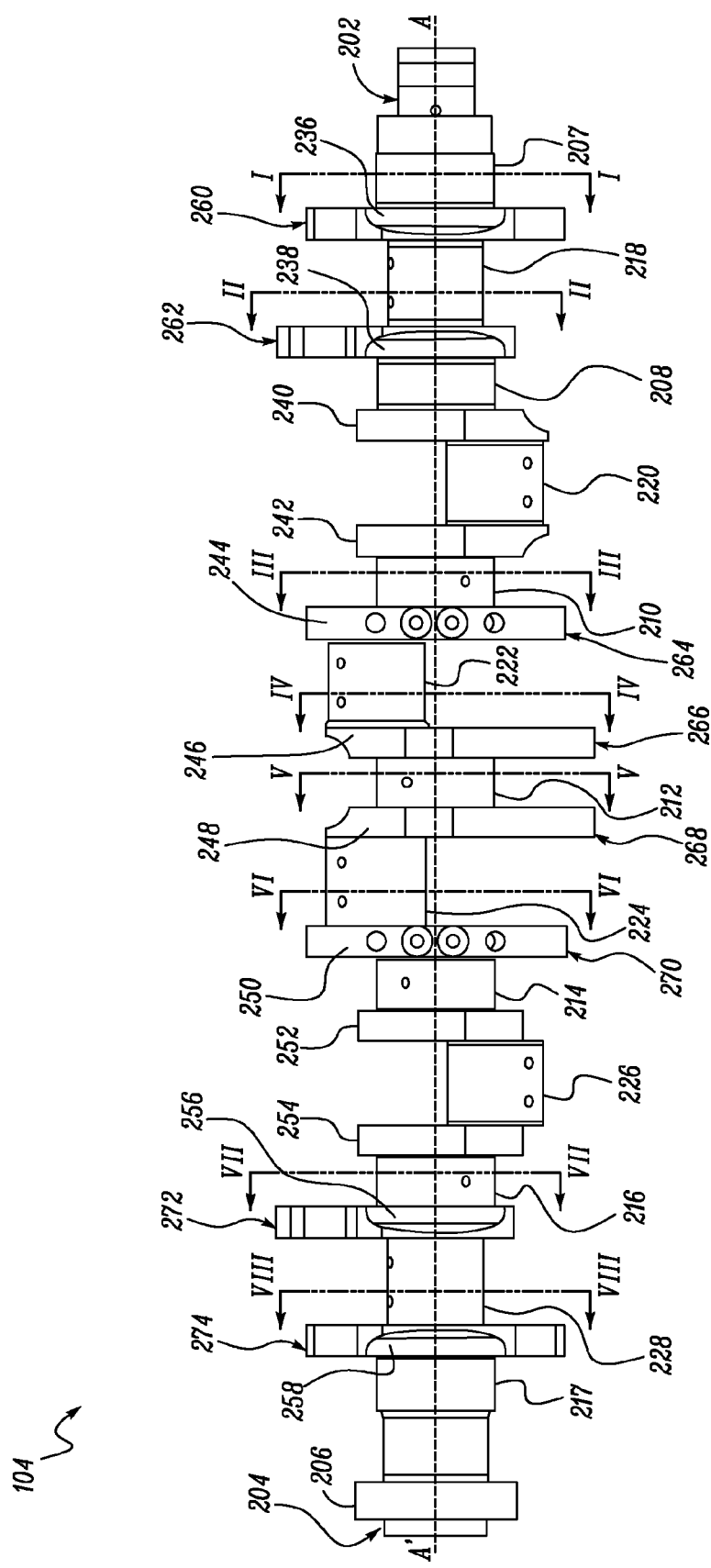
FIG. 2 is a side elevation view of a crankshaft for the internal combustion engine.

FIG. 2 illustrates a side elevation view of the crankshaft 104, according to an aspect of the present disclosure. As illustrated in the figure, the crankshaft 104 may include a front end 202, a rear end 204, and a central axis of rotation A-A' extending from the front end 202 to the rear end 204. The rear end 204 may include a flange 206 configured to attach to a flywheel (not shown).

Further, the crankshaft 104 may be configured to be rotatably mounted within the cylinder block 102 of the engine 100, by seven main bearing journals 207, 208, 210, 212, 214, 216 and 217 aligned longitudinally with the central axis A-A'. The crankshaft 104 may include crankpins 218, 220, 222, 224, 226 and 228, such that each of the crankpin 218-228 is configured to be suitably connected to the corresponding pistons 106 via a connecting rod 114 (see FIG. 1) in a conventional manner to rotate the crankshaft 104 about the central axis A-A'.

In an aspect of the present disclosure, a pair of outer crankpins may be defined by a front crankpin, such as the first crankpin 218 located in proximity to the front end 202 and a rear crankpin such as the sixth crankpin 228 located in proximity to the rear end 204. Further, a pair of inner crankpins may be defined by the second crankpin 220 and the fifth crankpin 226. Furthermore, a pair of central crankpins may be defined by a first central crankpin such as the third crankpin 222 and a second central crankpin such as the fourth crankpin 224. The pair of central crankpins 222 and 224 is located substantially equidistant from the front crankpin 218 and the rear crankpin 228. Further, as illustrated in FIG. 1, in an exemplary embodiment, the pairs of outer crankpins 218, 228, the inner crankpins 220, 226, and the central crankpins 222, 224 may be placed offset by an angle of about 120 degrees relative to each other.

Further, the crankshaft 104 may include six pairs of cheeks 236-238, 240-242, 244-246, 248-250, 252-254, and 256-258 provided on each side of the crankpins 218, 220, 222, 224, 226, and 228, respectively. The cheeks 236-258 couple the crankpins 218-228 to the main bearing journals 207, 208, 210, 212, 214, 216 and 217.

Furthermore, pairs of counterweights may be disposed on each side of the front crankpin 218, the rear crank pin 228, and the central crankpins 222-224. In one embodiment of the present disclosure, four pairs of counterweights such as a first pair of counterweights 260-262, a second pair of counterweights 264-266, a third pair of counterweights 268-270, and a fourth pair of counterweights 272-274 may be disposed on each side of the front crankpin 218, the first central crankpin 222, the second central crankpin 224, and the rear crankpin 228, respectively. In one embodiment, the pairs of counterweights 260-262, 264-266, 268-270, and 272-274 may be arranged such that, the individual counterweights in each pair are angularly offset with respect to each other.

Further, the first pair of counterweights 260-262 may be secured to the first pair of cheeks 236-238. The second pair of counterweights 264-266 may be secured to the third pair of cheeks 244-246. The third pair of counterweights 268-270 may be secured to the fourth pair of cheeks 248-250. The fourth pair of counterweights 272-274 may be secured to the sixth pair of cheeks 256-258. The counterweights 236-250 may be configured to counteract unbalanced forces arising during the operation of the engine 100.

In an exemplary embodiment, the counterweights 260-274 may be secured to the respective cheeks of the crankshaft 104 by using bolts. In various other alternative embodiments, the counterweights 260-274 may be welded to the corresponding cheeks or may be formed together by forging or casting with the crankshaft 104. Further, the counterweights 260-274 may include a number of receptacles/openings (not shown) configured to receive additional weights that may be required to further balance the crankshaft 104 during the operation of the engine 100.

FIGS. 3 to 10 illustrate sectional views of the crankshaft 104 taken in the direction of arrows I-I and II-II, III-III, IV-IV, V-V, VI-VI, VII-VII and VIII-VIII respectively, in FIG. 2. Further, the placement of the counterweights 260-274 may be described with reference to a horizontal plane P-P' substantially perpendicular to the central axis A-A', and in a counter-clockwise direction.

In an exemplary embodiment, the first counterweight 260 of the first pair of counterweights 260-262 may be substantially aligned with the plane P-P' and the second counterweight 262 may be arranged at an angle of 60 degrees from the first counterweight 260 of the first pair of counterweights 260-262 in the counter-clockwise direction.

In an exemplary embodiment, as shown in FIGS. 5 and 6, the first counterweight 264 of the second pair of counterweights 264-266 may be arranged at an angle of 180 degrees from the first counterweight 260 of the first pair of counterweights 260-262. Furthermore, the second counterweight 266 of the second pair of counterweights 264-266 may be arranged at an angle of 240 degrees from the first counterweight 260 of the first pair of counterweights 260-262.

In a further embodiment, as shown in FIG. 7, the first counterweight 268 of the third pair of counterweights 268-270 may be arranged at an angle of 240 degrees from the first counterweight 260 of the first pair of counterweights 260-262. Furthermore, as shown in FIG. 8, the second counterweight 270 of the third pair of counterweights 268-270 may be arranged at an angle of 180 degrees from the first counterweight 260 of the first pair of counterweights 260-262.

Further, as shown in FIG. 9, the first counterweight 272 of the fourth pair of counterweights 272-274 may be arranged at an angle of 60 degrees from the first counterweight 260 of the first pair of counterweights 260-262. In a further embodiment, as shown in FIG. 10, the second counterweight 274 of the fourth pair of counterweights 272-274 may be substantially aligned with the plane P-P' and the first counterweight 260 of the first pair of counterweights 260-262.

Although, the arrangement of the counterweights 260-274 is described in conjunction with a V-12 engine, it will be appreciated by a person skilled in the art, that the V-12 engine is merely exemplary in nature and hence non-limiting of this disclosure. The arrangement of the counterweights may be employed on any size of multiple cylinder internal combustion engines of an inline or a V-type configuration.

INDUSTRIAL APPLICABILITY

Typically, in an engine, a crankshaft includes counterweights where each counterweight is attached to each of the crankshaft's cheeks, in order to balance the engine. However, this kind of counterweight arrangement is difficult to manufacture and expensive too.

To this end, the crankshaft 104 for a V-12 internal combustion engine 100 is disclosed herein. The crankshaft 104 as disclosed herein, includes pairs of counterweights such as the first pair of counterweights 260-262, second pair of counterweights 264-266, the third pair of counterweights 268-270 and the fourth pair of counterweights 272-274 secured to the front crankpin 218, the first central crankpin 222, the second central crankpin 224 and the rear crankpin 228 respectively.

The crankshaft 104 according to the embodiments presented herein uses lesser number of counterweights to balance the engine 100 and improve torsional vibration level of the engine 100. Therefore, the lesser number of counterweights decrease the weight of the crankshaft 104. Further, the crankshaft 104 is easy to manufacture and cost effective.

What is claimed is:

1. A crankshaft having a front end, a rear end, and a central axis extending from the front end to the rear end, the crankshaft comprising:
    at least one front crankpin located in proximity to the front end;
    at least one rear crankpin located in proximity to the rear end;
    one or more central crankpins located substantially equidistant from the front crankpin and the rear crankpin; and pairs of counterweights disposed on each side of the front crankpin, the rear crankpin and the one or more central crankpins such that counterweights in each pair of counterweights are angularly offset with respect to each other, the pairs of counterweights including a first pair of counterweights disposed on each side of the front crankpin, the first pair of counterweights being arranged such that a first counterweight of the first pair of counterweights is substantially aligned with a horizontal plane perpendicular to the central axis and a second counterweight of the first pair of counterweights is arranged at an angle of 60 degrees from the first counterweight of the first pair of counterweights.

2. The crankshaft of claim 1, wherein the one or more central crankpins include a first central crankpin and a second central crankpin.

3. The crankshaft of claim 2, wherein the pairs of counterweights further include a second pair of counterweights disposed on each side of the first central crankpin, the second pair of counterweights is arranged such that a first counterweight of the second pair of counterweights is arranged at an angle of 180 degrees and the second counterweight of the second pair of counterweights is arranged at an angle of 240 degrees from a first counterweight of a first pair of counterweights respectively.

4. The crankshaft of claim 3, wherein the pairs of counterweights further include a third pair of counterweights disposed on each side of the second central crankpin, the third pair of counterweights is arranged such that a first counterweight of the third pair of counterweights is arranged at an angle of 240 degrees and the second counterweight of the third pair of counterweights is arranged at an angle of 180 degrees from a first counterweight of a first pair of counterweights respectively.

5. The crankshaft of claim 4, wherein the pairs of counterweights further include a fourth pair of counterweights disposed on each side of the rear crankpin, the fourth pair of counterweights is arranged such that a first counterweight of the fourth pair of counterweights is arranged at an angle of 60 degrees from a first counterweight of a first pair of counterweights and the second counterweight of the fourth pair of counterweights is substantially aligned with a horizontal plane perpendicular to the central axis.

6. The crankshaft of claim 5, wherein the crankshaft further includes pairs of cheeks coupled to the front crankpin, the rear crankpin, and the central crankpins.

7. The crankshaft of claim 6, wherein the first, second, third and fourth pair of counterweights are secured to the plurality of cheeks coupled to the front crankpin, the rear crankpin, and the central crankpins respectively, by using bolts.

8. A multiple cylinders internal combustion engine comprising:
a cylinder block having two banks of cylinders disposed at a predetermined angle with respect to each other;
a crankshaft disposed rotatably within the cylinder block and having a front end, a rear end, and a central axis extending from the front end to the rear end, the crankshaft comprising:
at least one front crankpin located in proximity to the front end;
at least one rear crankpin located in proximity to the rear end;
one or more central crankpins located substantially equidistant from the front crankpin and the rear crankpin; and
pairs of counterweights disposed on each side of the front crankpin, the rear crankpin and the one or more central crankpin such that counterweights in each pair of counterweights are angularly offset with respect to each other, the pairs of counterweights including a first pair of counterweights disposed on each side of the front crankpin, the first pair of counterweights being arranged such that a first counterweight of the first pair of counterweights is substantially aligned with a horizontal plane perpendicular to the central axis and a second counterweight of the first pair of counterweights is arranged at an angle of 60 degrees from the first counterweight of the first pair of counterweights.

9. The multiple cylinders internal combustion engine of claim 8 further comprising a plurality of pistons reciprocally mounted on corresponding plurality of cylinders on the two banks of cylinders.

10. The multiple cylinders internal combustion engine of claim 8, wherein the one or more central crankpins include a first central crankpin and a second central crankpin.

11. The multiple cylinders internal combustion engine of claim 10, wherein the pairs of counterweights further include a second pair of counterweights disposed on each side of a first central crankpin, the second pair of counterweights is arranged such that a first counterweight of the second pair of counterweights is arranged at an angle of 180 degrees and the second counterweight of the second pair of counterweights is arranged at an angle of 240 degrees from a first counterweight of a first pair of counterweights respectively.

12. The multiple cylinders internal combustion engine of claim 11, wherein the pairs of counterweights further include a third pair of counterweights disposed on each side of a second central crankpin, the third pair of counterweights is arranged such that a first counterweight of the third pair of counterweights is arranged at an angle of 240 degrees and the second counterweight of the third pair of counterweights is arranged at an angle of 180 degrees from a first counterweight of a first pair of counterweights respectively.

13. The multiple cylinders internal combustion engine of claim 12, wherein the pairs of counterweights further include a fourth pair of counterweights disposed on each side of the rear crankpin, the fourth pair of counterweights is arranged such that a first counterweight of the fourth pair of counterweights is arranged at an angle of 60 degrees from a first counterweight of a first pair of counterweights and the second counterweight of the fourth pair of counterweights is substantially aligned with a horizontal plane perpendicular to the central axis.

14. The multiple cylinders internal combustion engine of claim 13, wherein the first, second, third and fourth pair of counterweights are secured to pairs of cheeks coupled to the front crankpin, the rear crankpin, and the central crankpins respectively, by using bolts.

15. A crankshaft having a front end, a rear end, and a central axis extending from the front end to the rear end, the crankshaft comprising:
a pair of outer crankpins defined by a first crankpin and a sixth crankpin;
a pair of inner crankpins defined by a second crankpin and a fifth crankpin;
a pair of central crankpins defined by a third crankpin and a fourth crankpin;
a first pair of counterweights disposed on each side of the first crankpin, the first pair of counterweights is arranged such that a first counterweight of the first pair of counterweights is substantially aligned with a horizontal plane perpendicular to the central axis and a second counterweight of the first pair of counterweights is arranged at an angle of 60 degrees from the first counterweight of the first pair of counterweight;

a second pair of counterweights disposed on each side of the third crankpin, the second pair of counterweights is arranged such that a first counterweight of the second pair of counterweights is arranged at an angle of 180 degrees and the second counterweight of the second pair of counterweights is arranged at an angle of 240 degrees from the first counterweight of the first pair of counterweights respectively;

a third pair of counterweights disposed on each side of the fourth crankpin, the third pair of counterweights is arranged such that a first counterweight of the third pair of counterweights is arranged at an angle of 240 degrees and the second counterweight of the third pair of counterweights is arranged at an angle of 180 degrees from the first counterweight of the first pair of counterweights respectively; and a fourth pair of counterweights disposed on each side of the sixth crankpin, the fourth pair of counterweights is arranged such that a first counterweight of the fourth pair of counterweights is arranged at an angle of 60 degrees from the first counterweight of the first pair of counterweights and the second counterweight of the fourth pair of counterweights is substantially aligned with the horizontal plane and the first counterweight of the first pair of counterweights.

16. The crankshaft of claim 15, wherein the crankshaft further includes six pairs of cheeks coupled to the first, second, third, fourth, fifth and the sixth crankpins respectively.

17. The crankshaft of claim 15, wherein the first pair of counterweights, the second pair of counterweights, the third pair of counterweights, and the fourth pair of counterweights are secured to a first, third, fourth and a sixth pair of cheeks respectively, by using bolts.

18. The crankshaft of claim 15, wherein the pair of outer crankpins, the pair of inner crankpins, and the pair of central crankpins are placed offset by a predetermined angle relative to each other.

* * * * *